(12) United States Patent
Hanten et al.

(10) Patent No.: US 7,704,130 B2
(45) Date of Patent: Apr. 27, 2010

(54) SAUSAGE CASING BRAKE WITH ADJUSTABLE BRAKING FORCE

(75) Inventors: Jürgen Hanten, Bad Nauheim (DE); Martin Zurwieden, Sassenberg (DE)

(73) Assignee: Poly-Clip System GmbH & Co. KG (DE)

( * ) Notice: Subject to any disclaimer, the term of this patent is extended or adjusted under 35 U.S.C. 154(b) by 0 days.

(21) Appl. No.: 12/112,107

(22) Filed: Apr. 30, 2008

(65) Prior Publication Data
US 2008/0274680 A1 Nov. 6, 2008

(30) Foreign Application Priority Data
May 3, 2007 (DE) ................ 10 2007 020 805

(51) Int. Cl.
*A22C 11/00* (2006.01)
(52) U.S. Cl. ........................................ 452/32
(58) Field of Classification Search ............ 452/30–32, 452/35–37, 39, 46, 51
See application file for complete search history.

(56) References Cited

U.S. PATENT DOCUMENTS

| | | | |
|---|---|---|---|
| RE30,390 E * | 9/1980 | Kupcikevicius et al. ........ 452/31 |
| 4,335,488 A * | 6/1982 | Becker ........................ 452/33 |
| 4,430,773 A | 2/1984 | Becker et al. | |
| 4,437,209 A | 3/1984 | Duroyon | |
| 4,442,568 A * | 4/1984 | Petry ......................... 452/38 |
| 4,505,003 A * | 3/1985 | Becker et al. ................. 452/38 |
| 4,646,386 A * | 3/1987 | Dreisin ........................ 452/31 |
| 4,766,645 A * | 8/1988 | Lamartino et al. ............. 452/31 |
| 4,970,758 A | 11/1990 | Naples et al. | |
| 5,104,348 A * | 4/1992 | Powers et al. ................. 452/45 |

(Continued)

FOREIGN PATENT DOCUMENTS

DE 10 2004 024 438 A1 12/2005

(Continued)

OTHER PUBLICATIONS

EP 08 00 8449 Search Report.

*Primary Examiner*—Thomas Price
(74) *Attorney, Agent, or Firm*—Hahn Loeser & Parks LLP; Michael H. Minns

(57) ABSTRACT

A retention device for a tubular casing material for receiving a viscous or granular filling material in a packaging machine, in particular a clipping machine that has a filling tube for filling the tubular casing material with the filling material, where the retention device includes: a first brake ring, which can be mounted coaxially on the filling tube, the inner diameter of first brake ring being larger than the outer diameter of the filling tube and on the inner circumference of which a first brake is provided, along which the casing material can be guided in the filling direction of the filling material against a friction force acting upon the casing material. A second brake ring is also provided which can be stationarily disposed on the filling tube and which has a counter-brake on its outer circumference, where the casing material can be guided between the first brake of the first brake ring and the counter-brake of the second brake ring and where the first brake ring is reversibly displaceable in the filling direction for setting a predetermined friction force for the casing material at the first brake of the first brake ring and at the counter-brake of the second brake ring.

18 Claims, 5 Drawing Sheets

U.S. PATENT DOCUMENTS

| | | | | |
|---|---|---|---|---|
| 5,197,914 | A | * | 3/1993 | Powers .................. 452/32 |
| 5,203,735 | A | * | 4/1993 | Stanek .................. 452/38 |
| 5,916,019 | A | | 6/1999 | Whittlesey |
| 6,401,885 | B1 | * | 6/2002 | Whittlesey ............ 188/322.16 |
| 7,455,578 | B2 | * | 11/2008 | Maile et al. .................. 452/37 |

| | | |
|---|---|---|
| 2007/0180795 | A1 | 8/2007 Topfer |

FOREIGN PATENT DOCUMENTS

| | | |
|---|---|---|
| DE | 10 2005 044 879 B3 | 9/2006 |
| EP | 0 126 474 A1 | 11/1984 |
| GB | 2 109 219 | 6/1983 |

* cited by examiner

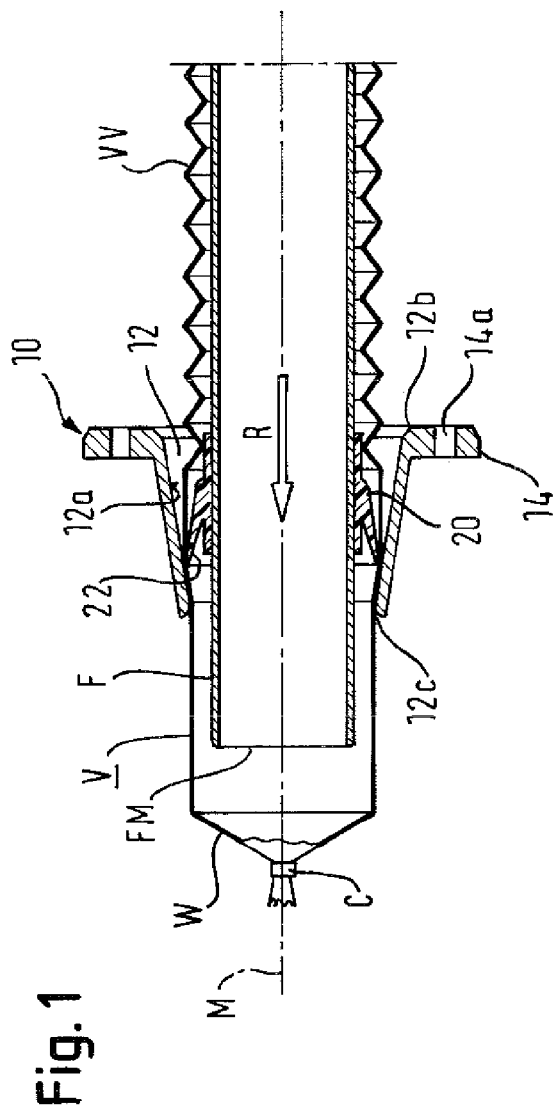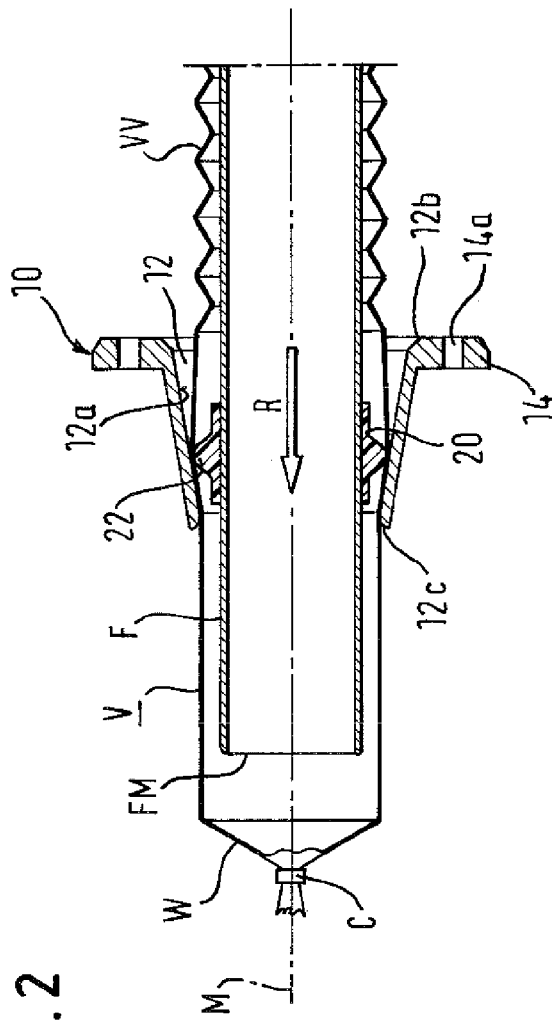
Fig. 1
Fig. 2

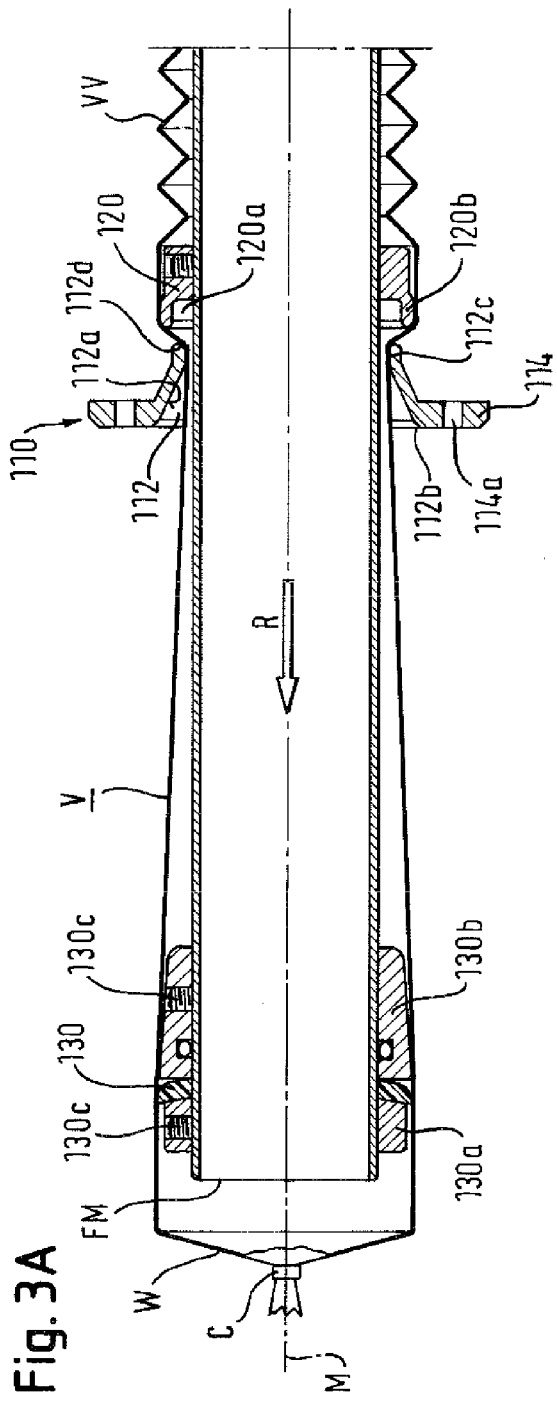
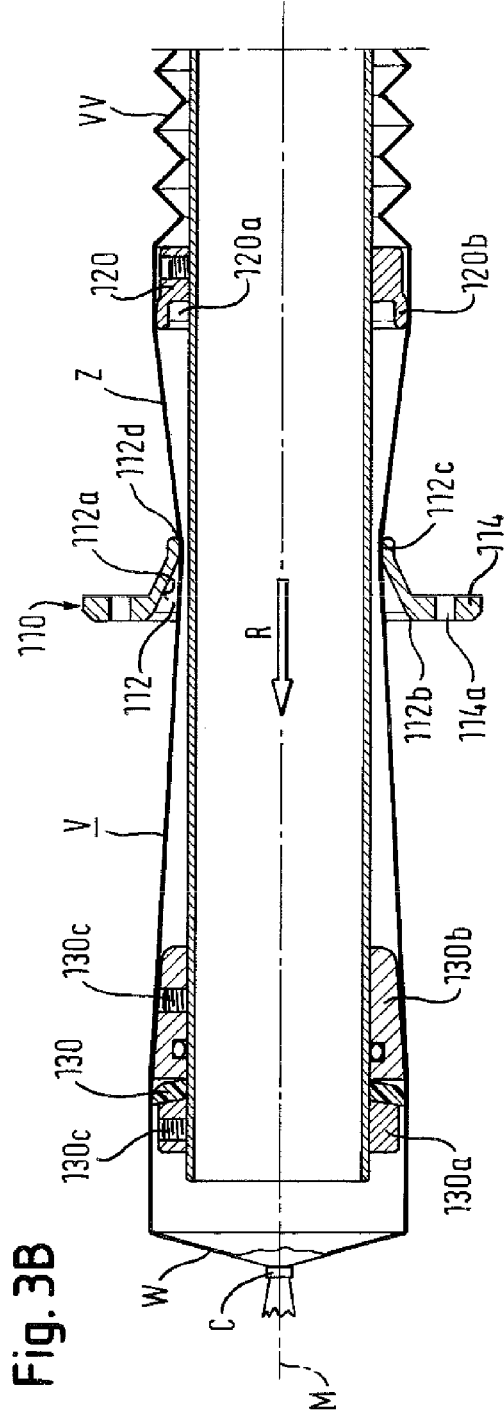

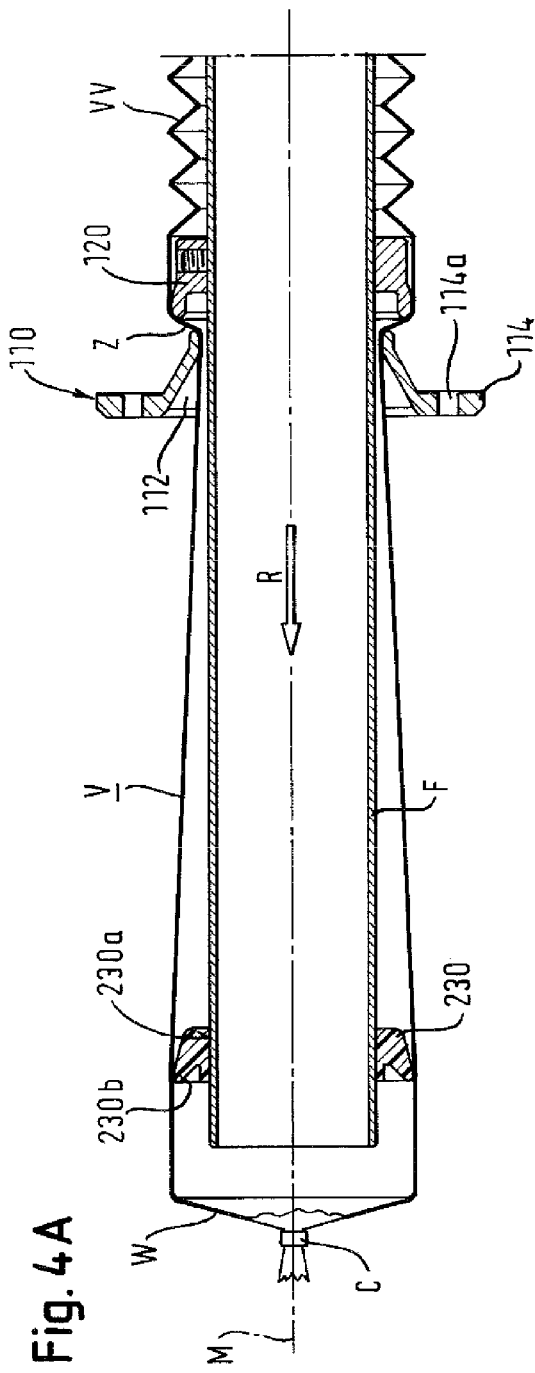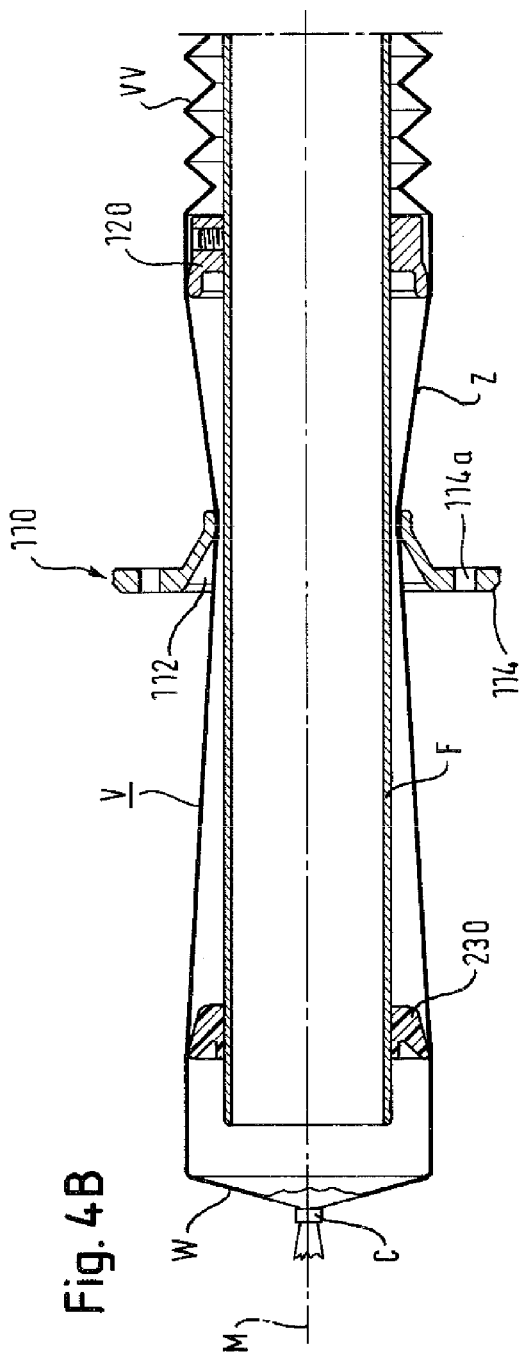

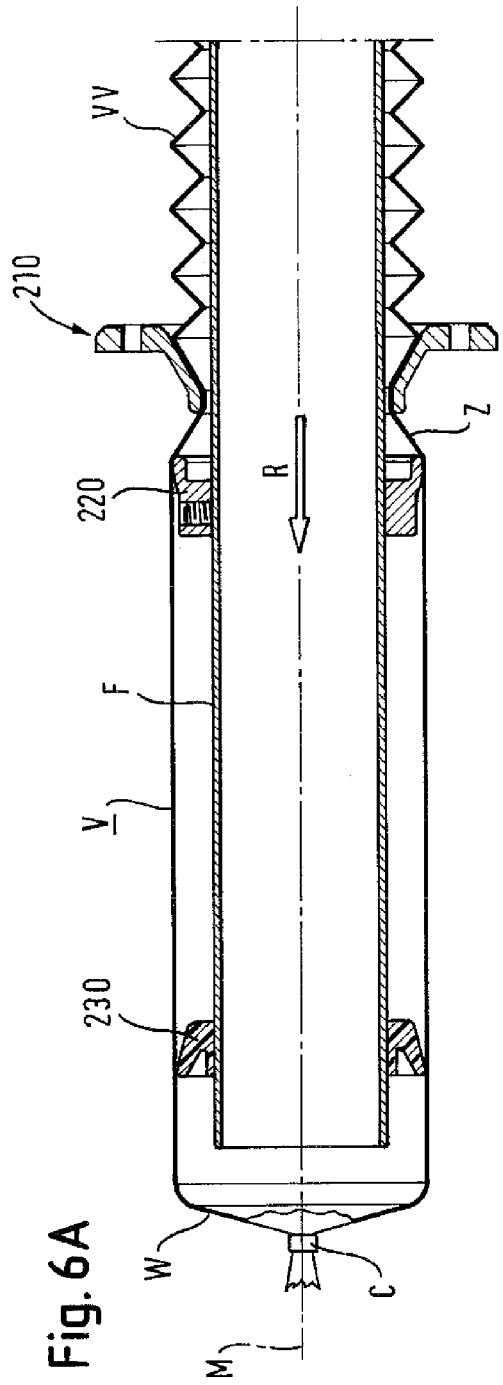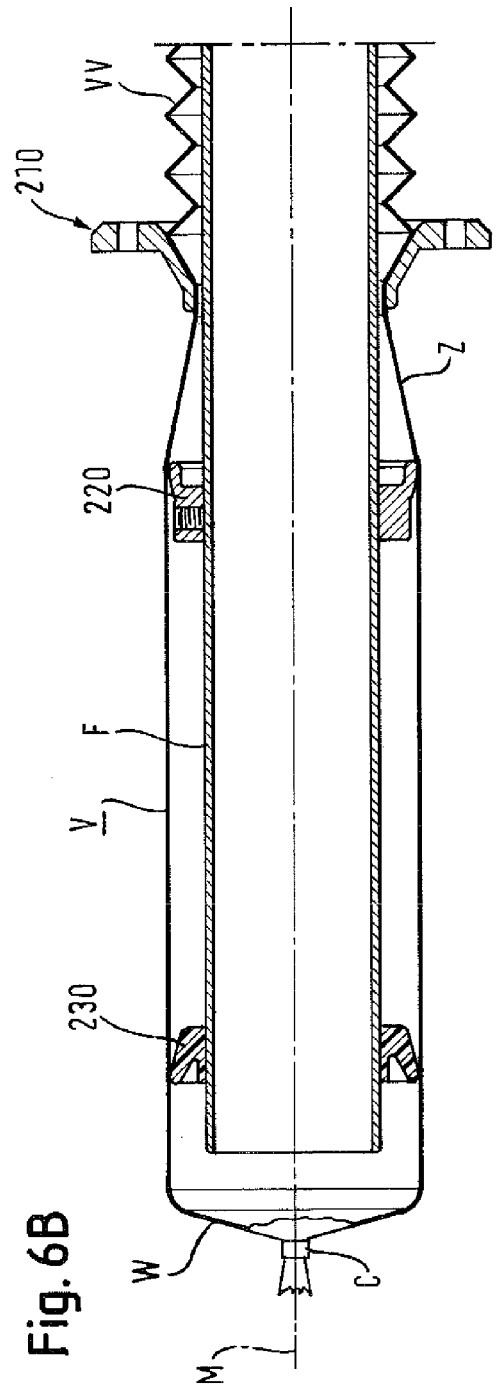

SAUSAGE CASING BRAKE WITH ADJUSTABLE BRAKING FORCE

BACKGROUND OF THE INVENTION

The present invention relates to a retention device for a tubular casing material for receiving a viscous or granular filling material in a packaging machine, in particular a clipping machine.

The invention relates, in particular, to a retention device for a tubular casing material for receiving a viscous or granular filling material in a packaging machine, in particular in a clipping machine, and preferably, in a sausage clipping machine that has a filling tube for filling the tubular casing material with the filling material, such as sausage meat. The retention device, or casing brake, includes a first brake ring, which can be mounted coaxially on the filling tube, the inner diameter of said brake ring being larger than the outer diameter of the filling tube and on the inner circumference of which brake ring a first brake means is provided, along which the casing material or sausage casing can be guided in the filling direction of the filling material against a friction force acting upon the casing material.

The present invention also relates to a clipping machine for producing sausage-shaped products, in particular sausage products, from a viscous or granular filling material such as sausage meat, which can be filled into a tubular casing material, such as a sausage casing, the clipping machine comprising a filling tube for filling the tubular casing material with the filling material in the filling direction, a supply of casing material disposed on the filling tube and a retention device for applying a predetermined friction force that acts counter to the filling direction on the casing material, which can be drawn off in the filling direction.

It is known, in practice, that when producing sausage products, for example, the sausage meat is fed by a filling machine to a clipping machine via a filling tube of the closing and severing unit. In the clipping machine, the filling material is filled into a tubular casing material that is closed at one end by a first clip, and the tubular casing material is closed by placing a second clip. The resultant sausage product is then severed from the remaining supply of casing material, and the finished sausage product is carried out of the clipping machine.

When a filling material, which, besides sausage meat, can also be putty or sealing compound, for example, is fed through a filling tube coupled to a filling machine into a tubular casing closed at one end, a sausage-shaped product is formed at the filling tube exit. The casing, which was previously pulled from the supply of casing material onto the filling tube either manually or automatically, or which was simultaneously formed from a flat web of film folded and sealed around the filling tube to form a tube, is drawn off the filling tube by the filling pressure.

In known clipping machines, a brake ring or casing brake is disposed around the filling tube near the filling tube exit. This casing brake, which typically includes an annular rubber lip, is biased elastically against the filling tube, thus pressing the casing against the filling tube. This pressure generates a friction force that ensures that the casing material or sausage skin is drawn in a controlled manner during the filling process from the supply disposed on the filling tube and that, depending on the bias of the brake ring, a sausage with the desired fullness is produced.

Such a retention device or casing brake is known from German patent application 10 2005 044 879 (US 2007/0072528). The device has a support bracket that can be moved parallel to the filling tube axis. Into this support bracket, a brake ring can be inserted that fully encircles the filling tube and exerts a pressure on the casing material guided between the brake ring and the filling tube in order to generate a friction force. By means of a crank transmission, the brake ring can be moved via the support bracket in accordance with the filling operation together with the casing material for a certain length in the pull-off direction, or in the opposite direction to the pull-off direction. By displacing the brake ring in the direction opposite to the filling direction, a volume into which the filling material can escape is created, by means of which the production rate of the clipping machine when continuously filling the casing material can be further increased.

These known retention devices or casing brakes have certain disadvantages, however. For example, the friction force, which is initially set by selecting the brake ring, is constant during the following production process at least, and cannot be changed during the ongoing process, or only with substantial interruptions of the production process. When the casing material is changed, it is necessary, to achieve an identical friction force and hence an identical braking effect, either to replace the currently used brake ring with a brake ring having a different inner diameter or a different braking behavior, or to change, i.e., increase or decrease, the amount by which the brake ring is compressed. In either case, as already mentioned, the production process must be interrupted. Fine adjustment of the braking force is not possible, or only in a very time-consuming manner. It may likewise be necessary to change the brake ring when the filling pressure changes, or when the brake ring squeeze value changes.

SUMMARY OF THE INVENTION

Proceeding from this, an object of the present invention is to provide a retention device and a clipping machine that can overcome the aforementioned disadvantages. More particularly, an object of the present invention is to provide a retention device and a clipping machine that allow the friction force produced by the retention device to be adapted accordingly in a simple manner to the material and/or production conditions.

What is proposed, in particular, is a retention device for a tubular casing material for receiving a viscous or granular filling material in a packaging machine, in particular in a clipping machine and preferably in a sausage clipping machine that has a filling tube for filling the tubular casing material with the filling material. The retention device contains a first brake ring, which can be mounted coaxially on the filling tube, the inner diameter of said brake ring being larger than the outer diameter of the filling tube and on the inner circumference of which brake ring a first brake means is provided, along which the casing material can be guided in the filling direction of the filling material against a friction force acting upon the casing material. A second brake ring is also provided which can be stationarily mounted on the filling tube and which has a counter-brake means on its outer circumference. The casing material can be guided between the first brake means of the first brake ring and the counter-brake means of the second brake ring, and the second brake ring is reversibly displaceable in the filling direction in order to set a predetermined friction force for the casing material at the first brake means of the first brake ring and the counter-brake means of the second brake ring. By means of such an arrangement, a desired friction force can be set independently of the casing material used and/or the filling pressure, in order to achieve an optimal braking effect with precision and in a simple manner.

The friction force can be applied to the casing material in a variety of ways. For example, it is possible that the casing material can be guided in sandwiched form between the first and the second brake ring. In other words, the first brake means of the first brake ring and the second brake means or second counter-brake means of the second brake ring form oppositely positioned contact sections or contact surfaces between which the casing material can be fed. In order to set the desired friction force, a pressing force acting along a line or on an area can thus be exerted in a simple manner on the casing material by moving the first brake ring to a different position.

In one advantageous configuration, the brake means of the first brake ring is formed by a first braking surface coaxial with its axis and tapering conically in the filling direction. The counter-brake means of the second brake ring can be formed by a second braking surface coaxial with its axis and tapering conically in the filling direction. It is particularly advantageous here when the gradient of the conical second braking surface of the second brake ring is at least approximately equal to the gradient of the conical first braking surface of the first brake ring. Such a configuration allows the selection of a smaller applied force in relation to the size of the surface, compared to the known solution, and, in contrast to the transmission of force at a point or along a line, is gentle on the casing material. It is likewise possible for the second brake ring to be made of a flexible or reversibly elastic material so that the contact section of the second brake ring contacting the inner circumferential surface of the casing material or the first braking surface of the first brake ring can form while the brake force is being adjusted. In such a case, the simplest solution consists in the possibility of the second brake ring contacting the inner circumferential surface of the casing material and the first braking surface of the first brake ring only along a line. This is possible, in particular, when the filling pressure is low, and only a small sealing effect is necessary as a consequence. However, if the filling pressure is high, then the flexible or elastic material of the second brake ring is squeezed together by moving the first brake ring in relation to the second brake ring, such that a conical or tapering second braking surface is likewise formed on the second brake ring. This second braking surface co-operates with the conical first braking surface of the first brake ring.

In addition to the configuration described in the foregoing for applying the friction force by guiding the sandwiched casing material between the first and the second brake rings, there is also the possibility of applying the friction force on the casing material by guiding the casing material along an at least approximately Z-shaped path between the first and the second brake ring. The friction force acting on the casing material is produced by a change in the size of the area of casing material that contacts the corresponding surface of the brake rings, which change is due to a change in the contact angle by which the casing material is wrapped around the respective sections of the brake rings. This change in size is achieved exclusively by the easily controlled displacement of the first brake ring relative to the second brake ring.

The first brake ring is advantageously provided on its inner circumference with a first braking deflection section forming a first brake means for the casing material, at which section the casing material can be deflected for the first deflection of the at least approximately Z-shaped path. The second brake ring can be provided on its outer circumference with a second counter-braking deflection section or second brake means or counter-brake means for the casing material, at which section the casing material can be deflected for the second deflection of the at least approximately Z-shaped path. By displacing the first brake ring, it is possible to change in an advantageous manner the course of the at least approximately Z-shaped path of the casing material, and hence the size of the casing material area which contacts the deflection sections of the brake rings.

It is advantageous when the first brake ring has a guide surface along which the casing material is guided before reaching the first deflection section. Such a guide surface smoothes the casing material, which is folded on the filling tube to form a supply of material, and thus prevents creases in the casing material being formed in the region of the brake ring when the casing material is being drawn off. This is important because sharp-edged folds in the casing material can lead to damage to the material that render useless the sausage-shaped products being produced, or which can lead to the damaged casing bursting, which then results in lengthy down times.

The position of the brake ring on the filling tube depends on various factors. It is possible for the first brake ring to be mounted upstream from the second brake ring in the filling direction, or to be mounted on the filling tube downstream from the second brake ring. Whatever the arrangement, however, it is important that the deflection sections of the two brake rings are facing each other, in order to ensure a deflection according to the invention.

The first brake ring can be displaced in a variety of ways. The adjustment can be carried out manually, for example, or by means of a motor. In one advantageous configuration, a preferably powered device is provided for moving the first brake ring. Such a drive device can be actuated in a simple, known manner and ensures that the desired friction force is set with precision. The drive unit can be electrically, pneumatically or hydraulically operated.

In order to prevent undesired displacement of the first brake ring once the desired friction force has been set, it makes sense to fix this first brake ring in place. It is advantageous in this regard when a locking mechanism is provided for locking the first brake ring in an axial position.

In another advantageous configuration, a regulating device is provided for maintaining the predetermined friction force. This device can smooth out irregularities in the casing material, for example, such as variations in its thickness or surface roughness, or can compensate for fluctuations in the filling pressure.

To prevent filling material from flowing into the cavity between the filling tube and the supply of casing material, it is advantageous when a sealing mechanism is provided.

There are various possible ways of providing the sealing mechanism. For example, the sealing mechanism can be formed by the second brake ring itself. In other words, the "brake" and "seal" function can be combined in one component. In this case, the second brake ring is made of an appropriate flexible or elastic material, which is not only reversibly deformable for achieving the sealing function, but also has sufficient strength to perform the braking function. The braking function is achieved by producing the aforementioned pressing force acting along a line or on an area between the two components, independently of the outer contour of the second brake ring or its geometrical design, by moving the first brake ring against the second brake ring. As already mentioned, this surface pressing is achieved in the case of the second brake ring by virtue of its being reversibly deformable.

The sealing mechanism may also be provided separately from the second brake ring. In other words, the "seal" function and the "brake" function are realized in two components that are provided separately from one another. The sealing mechanism can be disposed downstream in the filling direction from the second brake ring at a distance therefrom. In this way, filling material can be advantageously prevented from entering the region between the first and the second brake ring and thus affecting the friction force to be generated.

It is also advantageous when the outer diameter of the sealing mechanism is at least approximately equal to the maximum outer diameter of the second brake ring.

A wide variety of configurations can be provided for the sealing mechanism itself For example, the sealing mechanism may be embodied as a lip seal or as a cup-shaped seal.

If the diameter of the lip seal can be adjusted within a certain range at least, it is possible for irregularities in the diameter of the casing material, such as those which can occur between different production batches, to be smoothed out in a particularly advantageous manner.

What is proposed, in particular, is a clipping machine for producing sausage-shaped products, in particular sausage products, from a viscous or granular filling material such as sausage meat, which can be filled into a tubular casing material, such as a sausage casing, said clipping machine comprising a filling tube for filling the tubular casing material with the filling material in the filling direction, a supply of casing material disposed on the filling tube and a retention device for applying a predetermined friction force that acts counter to the filling direction on the casing material which can be drawn off in the filling direction.

BRIEF DESCRIPTION OF THE DRAWINGS

Other advantageous configurations and three embodiments of the invention shall now be described with reference to the attached drawings. The terms "top", "bottom", "left" and "right" used when describing the embodiments relate to the drawings oriented in such a way that the reference numerals and names of the figures can be read normally.

In the drawings,

FIG. 1 shows a schematic side view of a first embodiment of the inventive retention device having a cup-shaped seal;

FIG. 2 shows a schematic side view of the inventive retention device in FIG. 1, but with a lip seal;

FIGS. 3A, 3B show a schematic side view of a second embodiment of the inventive retention device, with an adjustable lip seal and with a brake ring in a first and in a second brake position;

FIGS. 4A, 4B show a schematic side view of the second embodiment of the inventive retention device shown in FIGS. 3A and 3B, with a cup-shaped seal and with the first brake ring in a first and second brake position;

FIGS. 6A, 6B show a schematic side view of a third embodiment of the inventive retention device, with a cup-shaped seal and with the first brake ring in a first and in a second brake position.

DETAILED DESCRIPTION OF THE DRAWINGS

Figure 5A:
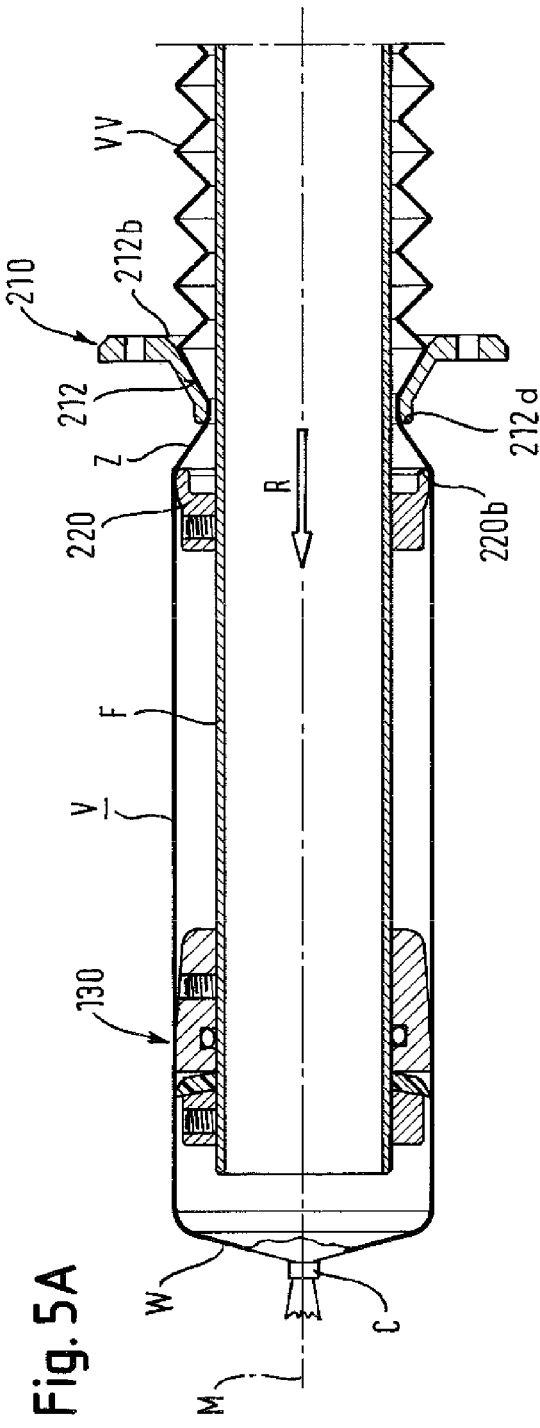
FIGS. 5A, 5B show a schematic side view of a third embodiment of the inventive retention device, with an adjustable lip seal and with a brake ring in a first and in a second brake position.

The embodiments of the inventive retention device described in the following are used in the inventive clipping machines, in particular sausage clipping machines, of the kind initially specified. These machines are used to make sausage products. The inventive retention device may also be used, of course, in clipping machines which are used to make sausage-shaped products that are not foodstuffs, but where the filling material is a sealing compound, for example, or an adhesive.

FIGS. 1 and 2 show a schematic side view of a first embodiment of the inventive retention device. This retention device is used in a clipping machine of which only a filling tube F is shown, by means of which a filling material (not shown in any further detail), in this case sausage meat, can be fed in filling direction R, i.e. in the horizontal direction from right to left, by a filling machine which is likewise not shown in any further detail, to a sausage product W being produced at filling tube exit FM. Filling tube F has a circular cross-section and is preferably made of stainless steel.

A supply VV of tubular casing material V, preferably of plastic, is disposed on filling tube F concentrically to the longitudinal axis M thereof, the supply extending to the left from the right-hand end of filling tube F as still shown in FIGS. 1 and 2. By zigzagged folding of casing material V, a sufficiently large supply VV of said material is provided, without much space being required for same. Before a filling operation begins, the supply VV of casing material V can be pushed manually or automatically onto filling tube F from filling tube exit FM. It is likewise possible for supply VV of casing material V to be produced continuously or discontinuously during the filling operation from a flat web material which is shaped into a tube and placed in intermediate storage in supply VV.

As can be seen from FIGS. 1 and 2, the tubular casing material V extends from supply VV concentrically to the longitudinal axis M of filling tube F beyond the filling tube exit FM. To the left of filling tube exit FM, the end portion of casing material V is gathered into a tress and closed by a clip C applied by the clipping machine such that no filling material can escape. The end of casing material V forms the one end of sausage-shaped product W, which is also referred to as the "sausage end".

Upstream from the filling tube exit FM of filling tube F, in other words in the opposite direction to filling direction R, the inventive retention device is disposed on filling tube F. Said device comprises a first brake ring 10 and a second brake ring 20. Both the first and the second brake rings 10, 20 may be made of plastic or metal, preferably of stainless steel.

The first brake ring 10 is disposed on filling tube F coaxially to the longitudinal axis M thereof such that it can be moved or displaced in relation to filling tube F. The first brake ring 10 has a through hole 12 which tapers conically or conoidally in filling direction R. Casing material V is guided through hole 12. The inner circumferential surface 12a of conical through hole 12 forming a first brake means is uniform and smooth so that damage to casing material V is avoided. Both the diameter of the inlet opening 12b at the right-hand end of through hole 12 and the left-hand discharge opening 12c are significantly larger than the outer diameter of filling tube F.

In the region of the right-hand inlet opening 12b of hole 12, at the outer circumference 14 thereof, a flange 14, which is integrally molded therewith, extends radially at least approximately substantially at an angle of 90° thereto and fully surrounds said inlet opening 12b. Flange 14 is used to move the first brake ring 10 manually or by motor means into a desired position parallel to the longitudinal axis M of filling tube F. In order to allow a force transmitting connection between first brake ring 10 and the actuating device (not shown), a plurality of flange bores 14a are provided which are arranged in an equally spaced manner in the circumferential direction of flange 14 and which all extend substantially parallel to longitudinal axis M.

It should also be mentioned that, as can be seen from FIG. 1, some edges of the first brake ring 10 are beveled in order to prevent the casing material V from being damaged when passing through brake ring 10.

Second brake ring 20, whose axial length is smaller than that of first brake ring 10, is stationarily disposed inside first brake ring 10 on filling tube F. The inner diameter of second brake ring 20 corresponds to the outer diameter of filling tube F. Second brake ring 20 may be held in place by a clamp fit, for example, in order to mount it stationarily on filling tube F.

Tubular casing material V, which as already mentioned is closed downstream from filling tube exit FM of filling tube F by a clip C, and upstream from the inventive retention device forms the supply VV from which casing material V can be drawn off during the production process, is pulled over filling tube F and brake ring 20. The outer diameter of brake ring 20 is at least approximately equal to the inner diameter of tubular casing material V, as a result of which the tubular casing material V contacts brake ring 20 under slight tension. As can also be seen from FIGS. 1 and 2, the casing material V is received in a sandwiched form between the outer contour of second brake ring 20 and the inner contour of first brake ring 10. As will be explained below in further detail, the second brake ring 20 serves simultaneously as a seal so that no filling material can enter the cavity formed by filling tube F and supply VV of casing material V.

Since the maximum inner diameter of conical through hole 12 of first brake ring 10 is larger than the maximum outer diameter of second brake ring 20, as shown in FIGS. 1 and 2, the first brake ring 10 also encloses the second brake ring 20. However, because the minimum diameter of conical through hole 12 is smaller than the minimum outer diameter of second brake ring 20, the first brake ring 10 cannot be moved in its entirety over the second brake ring 20.

The second brake ring 20 may be formed in different ways. In the embodiment of the second brake ring 20 reproduced in axial cross-section in FIG. 1, it is embodied as a lip seal. As has already been mentioned above, this embodiment is used to combine the "brake" function and the "seal" function. More particularly, the second brake ring 20 has a lip 22 extending slantingly upwards from right to left in FIG. 1 to form a second brake means or second counter-brake means; casing material V runs past said lip on the outer side thereof. As can also be seen from FIG. 1, lip 22 contacts the inner circumferential surface 12a of first brake ring 10. If the first brake ring 10 is moved to the right, i.e. in the direction opposite to filling direction R, then lip 22 is bent downwards in the direction of longitudinal axis M of filling tube F by conical inner through hole 12 or the inner circumferential surface 12a thereof. As a result, the tip of lip 22 moves into contact not only with the inner circumferential surface 12a and with the inner circumferential surface of casing material V, which is guided between first brake ring 10 and second brake ring 20, but also forms a surface with which casing material V is pressed against the inner circumferential surface 12a of first brake ring 10. However, it is essentially possible that there is contact between the tip of lip 22 and the inner circumferential surface of casing material V and the inner circumferential surface 12a of first brake ring 12 only along a line. If the filling pressure is suitably low, this contact along a line between second brake ring 20 and first brake ring 10 and casing material V accommodated therebetween may be sufficient.

In the configuration of the second brake ring 20 shown in FIG. 2, the second brake ring 20 has a triangular shape in the axial cross-section shown in FIG. 2. The apex 22 of the triangle may be configured as a genuine apex or may be flattened, as shown in FIG. 2. In both cases, apex 22 points radially outwards. As in the embodiment of the second brake ring shown in FIG. 1, the casing material is guided through the gap between the triangular tip 22 of second brake ring 20 and the inner circumferential surface 12a of first brake ring 10. If the first brake ring 10 is moved from left to right, then, due to the conical shape of through hole 12, the inner circumferential surface 12a of said through bore 12 compresses the tip 22 of second brake ring 20, so that said tip 22 comes into flat contact with the inner circumferential surface of casing material V or the inner circumferential surface 12a of first brake ring 12. Just like the embodiment in FIG. 1, however, it may suffice for tip 22 of the triangular brake ring 20 to come into contact with the inner circumferential surface of casing material V or the inner circumferential surface 12a of first brake ring 10 along a line only, if the filling pressure is sufficiently small.

The material of second brake ring 20 may be chosen from a variety of materials. To be able to fulfill its twin functions of sealing and braking, the material of second brake ring 20 should be flexible or reversibly elastically deformable, on the one hand, yet have sufficient strength to provide sufficient braking force and a sufficient sealing effect when lip 22 or the triangular tip 22 of second brake ring 20 is pressed together, along a line or across an area, with the inner circumferential surface of casing material V or the inner circumferential surface 12a of first brake ring 10.

It should also be mentioned, in conclusion, that first brake ring 10 may also be provided, of course, in an arrangement that is rotated 180° about a rotational axis which perpendicularly intersects the longitudinal axis M. In other words, the first brake ring 10 in FIGS. 1 and 2 is then arranged such that it is rotated by 180° in the plane of the drawing of said two Figures.

Depending on the filling pressure and/or the material selected for casing material V, a desired friction or braking force of the retention device is set before a filling operation commences. For the embodiments in FIG. 1 or FIG. 2, this is done by axially displacing brake ring 10. If the first brake ring 10 is moved further in the direction of second brake ring 20, i.e., in the opposite direction to filling direction R, the contact sections of brake rings 10, 20, i.e. the inner circumferential surface 12a of first brake ring 10 and the lip or triangular tip 22 of second brake ring 20, or the surfaces resulting from the elasticity of the material of second brake ring 20, move closer together. This causes the resultant pressing along a line or across a surface between contact sections 12a, 22, or the linear or surface pressing on casing material V, which, as shown in FIGS. 1 and 2, is sandwiched between the two areas 12a, 22. As a result, the friction force between casing material V and brake rings 10, 20 increases, due to the filling pressure acting on casing material V, when casing material V is being drawn from the supply thereof on filling tube F, as a consequence of which the pull-off resistance of casing material V and the braking force also increase.

A higher resistance may be desirable when pulling off casing material V during the filling of a sausage product W, for example when the machine is operated with a high filling pressure and the pull-off rate of casing material V is to be limited by adjusting the friction force. A higher friction force may also be desirable in the case of very stiff casing material V, to ensure that the material is pulled off in a crease-free manner.

If, in contrast, brake ring 10 is axially displaced in the filling direction R, the gap between contact sections 12a, 22 of brake rings 10, 20 and the line or area of pressing between contact sections 12a, 22 decreases. This also causes a decrease in the braking force on casing material V. This may be advantageous, for example when a lower pressure is used for filling, or when a softer casing material V is to be used.

As can be seen from the above description of how the retention device works, it is advantageous when contact sections 12a, 22 have the same gradient. A change in the gradient should therefore apply equally to both contact sections 12a, 22, but this is assured when the second brake ring 20 is made of an elastic or flexible material. A change in the gradient of conical surface 12a of first brake ring 10 allows the fineness of adjustment to be varied when setting the friction force or braking force. If a flatter gradient is chosen, brake ring 10 must be moved a longer distance in order to achieve the same surface pressing than if the gradient is greater. This enables finer gradation, i.e., higher precision when setting a desired surface pressing, and hence of a desired friction or braking force. If, in contrast, the gradient of the conical surfaces in increased, the adjustment precision is lowered.

As can be seen from FIGS. 1 and 2, the inner circumferential surface 12a of conical through hole 12 is aligned with its smaller inner diameter in the direction of the filling tube exit FM, in filling direction R. Of course, the first brake ring 10 may also be disposed in such a way that the smaller inner diameter is aligned in the opposite direction to filling direction R. In other words, the first brake ring 10 is rotated in the latter case by 180° in the plane of the drawings in FIGS. 1 and 2. Depending on the type of actuation used for the first brake ring 10, such an arrangement can be advantageous. However, it should be noted that when brake ring 10 has too much play due to the drawing off of casing material V, a self-inhibition and hence too strong a braking effect can occur due to the first brake ring 10 being pulled with the casing material in filling direction R, i.e., in the braking direction.

FIGS. 3A to 6B show other advantageous configurations of the inventive retention device and of the inventive clipping machine. These embodiments are described below. Only the differences in relation to the two embodiment in FIGS. 1 and 2 will be described in detail. Where components are of identical construction and/or function, the same reference signs as in the embodiments in FIGS. 1 and 2, increased respectively by 100, are used.

As can be seen from the embodiment in FIGS. 3A and 3B, the clipping machine likewise includes a filling tube F with a circular cross-section. As in the embodiment described in the foregoing, the tubular casing material V extends from supply VV concentrically to the longitudinal axis M of filling tube F beyond the filling tube exit FM. To the left of filling tube exit FM, the end portion of casing material V is gathered into a tress and closed by a clip C applied by the clipping machine such that no filling material can escape.

Upstream from filling tube exit FM of filling tube F, in other words in the opposite direction to filling direction R, the inventive retention device is disposed on filling tube F. In the present embodiment, said device comprises a first brake ring 110 and a second brake ring 120. Both the first and the second brake rings 110, 120 may be made of plastic or metal, preferably of stainless steel. In addition to the retention direction, and downstream therefrom, a sealing mechanism 130, preferably made from an elastomer, is disposed near the filling tube exit FM.

The first brake ring 110 is disposed on filling tube F coaxially to the longitudinal axis M thereof such that it can be moved or displaced in relation to filling tube F. First brake ring 110 has a through hole 112 which tapers conically or conoidally in the opposite direction to filling direction R. The inner circumferential surface 112a of conical through hole 112 is uniform and smooth. The diameter of the left-hand discharge or through opening 112b of conical through hole 112 is significantly larger than the diameter of filling tube F. The diameter of the right-hand inlet or through opening 112c corresponds to the outer diameter of filling tube F plus at least the thickness of casing material V. Hence, the diameter of through opening 112c is so large that no braking friction force is exerted by the first brake ring 110 on casing material V when the latter is being pulled through between first brake ring 110 and filling tube F.

In the region of the left-hand through opening 112b of through hole 112, at the outer circumference thereof, a flange 114, which is integrally molded therewith, extends radially at least approximately substantially at an angle of 90° thereto and fully surrounds said through opening. Flange 114 is used to move the first brake ring 110 manually or by motor means into a desired position parallel to the longitudinal axis M of filling tube F. In order to allow a force transmitting connection between first brake ring 110 and the actuating device (not shown), a plurality of flange bores 114a are provided which are arranged in a uniformly spaced manner in the circumferential direction of flange 114 and which all extend substantially parallel to longitudinal axis M.

Further upstream from first brake ring 110, second brake ring 120 is stationarily disposed on filling tube F and coaxially to first brake ring 110 and said filling tube F. The second brake ring 120 is configured in this embodiment as a forming ring. This means that the casing material V drawn from the folded supply VV of casing material is pulled over the ring and is smoothed thereby. Forming ring 120 may likewise be made of plastic or metal, and preferably of stainless steel. The inner diameter of forming ring 120 corresponds to the outer diameter of filling tube F. In order to mount it stationarily, forming ring 120 can be held in place on filling tube F by a clamp fit, for example. Its outer diameter can be at least approximately equal to the inner diameter of tubular casing material V, but may also be smaller. On its side, which is upstream from the displaceable first brake ring 110, forming ring 120 has an annular recess 120a on its inner side, which extends radially as far as filling tube F in the direction of longitudinal axis M, at a distance from the surface of the forming ring. Recess 120a extends in the axial direction from the left-hand front edge of the forming ring facing first brake ring 110 by about one third of the axial length of forming ring 120 to the right, that is to say in the opposite direction to the filling direction R. A lip 120b projecting axially from forming ring 120 is thus formed oriented in the direction of the displaceable first brake ring 110. In the embodiment shown, the outer edge of axial lip 120b has a slightly larger diameter than forming ring 120 itself, for which reason the tubular casing material V pulled over said forming ring 120 is in contact with forming ring 120 along a circular line extending circumferentially around forming ring 120. In this way, the friction arising between forming ring 120 and tubular casing material V can be reduced to a minimum when pulling off the material in a crease-free manner.

Downstream from the retention device, i.e., in filling direction R, a sealing ring 130 forming the sealing mechanism is stationarily and coaxially mounted on filling tube F near the exit FM of filling tube F. In this embodiment, sealing ring 130 is configured as a lip seal whose outer diameter can be adjusted. Such a sealing ring 130 usually consists of a suitable elastomer. Its inner diameter corresponds to the outer diameter of filling tube F, and its outer diameter is approximately equal to the inner diameter of casing material V, with which it is then in sealing contact. Sealing ring 130 is fitted with its inner diameter on the filling tube and projects radially away from said ring. It slants in filling direction R. Its cross-section has the shape of a parallelogram, but the side facing filling tube F extends parallel to said tube. The circumferential surface of sealing ring 130 slants in a direction opposite to filling direction R.

Adjusting rings 130a, 130b are disposed immediately in front of and behind sealing ring 130. They may be made of plastic or metal, and preferably of stainless steel if used in the food industry. The inner diameter of adjusting ring 130a disposed downstream from sealing ring 130 on filling tube F corresponds to the outer diameter of filling tube F. The outer diameter of its approximately cylindrical circumferential surface is smaller than the outer diameter of sealing ring 130. The second adjusting ring 130b is disposed upstream from sealing ring 130. Its inner diameter corresponds to that of the first adjusting ring 130a. Its slightly conical outer surface is slanted upstream in the direction of the retention device. Its maximum outer diameter is approximately equal to the outer diameter of sealing ring 130. The axial length of the second adjusting ring 130b is approximately equal to double the axial length of the first adjusting ring 130a. In the present embodiment, both adjusting rings 130a, 130b have radial threaded bores into which set screws 130c are screwed, for axially fixing the rings on filling tube F and for adjusting the diameter of sealing ring 130.

Tubular casing material V is pulled over the forming ring 120 stationarily mounted on filling tube F and over sealing mechanism 130 and is fed between brake ring 110 and filling tube F. Upstream from forming ring 120, the tubular casing material V forms supply VV and is closed downstream from exit FM of filling tube F by a closure means, such as a clip C.

In the embodiment shown in FIGS. 3A and 3B, the first brake ring 110 is likewise moved axially towards the second brake ring or forming ring 120 in order to change the pull-off resistance of casing material V, for example to adjust it to a selected filling pressure or to casing material V.

This change in the pull-off resistance of material V is based in this embodiment on the change in the deflection of the casing material V by brake ring 110 and forming ring 120. The casing material V is guided between brake ring 110 and forming ring 120 on an approximately Z-shaped path that extends along the outer circumference of forming ring 120, then approximately radially in the direction of filling tube F and then axially along filling tube F between filling tube F and the inner diameter of the first brake ring 110. Along said path, casing material V passes the deflection sections that are formed on forming ring 120 by lip 120b and on the first brake ring 110 by the outer edge 112d of through opening 112c. The outer edge 112d forms a first brake means of the first brake ring 110, whereas lip 120b forms the second brake means or second counter-brake means of the second brake ring or of forming ring 120.

To increase the pull-off resistance of casing material V, the first brake ring 110 can be moved axially in the direction of forming ring 120, as shown in FIG. 3A. The deflection of the casing material V guided along an approximately Z-shaped path Z then increases at deflection sections 112d, 120b of brake ring 110 and of forming ring 120. The increasing deflection of casing material V results in deflection sections 112d, 120b being more strongly embraced by casing material V, i.e. there is an increase in the area of contact of casing material V with deflection sections 112d, 120b. Due to the increased contact surface of casing material V on deflection sections 112d, 120b, there is also an increase in the friction between the contact surfaces on deflection sections 112d, 120b of brake ring 110 and of forming ring 120 and on casing material V, as a consequence of which the pull-off resistance of casing material V increases.

If, in contrast, brake ring 110 is moved away from forming ring 120, i.e. in the filling direction as shown in FIG. 3B, the creasing in the tubular casing material V decreases between forming ring 120 and brake ring 110. This reduces the area of contact of casing material V on deflection sections 112d, 120b and likewise reduces the friction between the contact surfaces on deflection sections 112d, 120b of the brake ring and of forming ring 120 and on casing material V. The pull-off resistance of casing material V also decreases as a consequence.

In the embodiments shown, the casing material V is deflected between the forming ring 120 and the brake ring 110 by about 90° at most in each case. However, it is also possible to configure the annular recess 120a of forming ring 120 in such a way that the deflection section 112d of brake ring 110 can dip into annular recess 120a. This would result in even stronger creasing of casing material V and a further increase in the area of contact of casing material V on deflection sections 112d, 120b, whereupon the pull-off resistance would increase still further.

The sealing mechanism 130 disposed on filling tube F downstream from the retention device is configured, as already mentioned, as a lip seal with an adjustable outer diameter. To adjust the diameter, the slant of the lip can be changed such that a desired diameter at the outer edge of the sealing lip of the sealing ring or sealing mechanism 130 is provided. This is achieved by changing the position of adjusting rings 130a, 130b. As can be seen from FIG. 3A, the slant of lip seal 130 is reduced by moving adjusting rings 130a, 130b axially towards each other along filling tube F. This causes the outer diameter of the sealing lip of sealing ring 130 to increase. By moving adjusting rings 130a, 130b axially away from each other, the outer diameter of lip seal 130 decreases by increasing the slant angle of the sealing lip while its inner diameter remains constant. Understandably, the diameter can only be adjusted within a range that depends on the material itself and the size of sealing ring 130. As an alternative to moving the two adjusting rings 130a, 130b on filling tube F, one of the adjusting rings 130a, 130b can remain fixed while the respective other adjusting ring 130b, 130a is moved in the desired direction. However, it is also conceivable that the diameter be changed by replacing sealing ring 130, or by combining replacement and adjustment of the ring. Depending on the stability required, metals (preferably stainless steel) and plastics can be used as the material for adjusting rings 130a, 130b. To fix adjusting rings 130a, 130b on filling tube F, they may be provided with radial threaded bores into which set screws 130c, for example, can be screwed. However, it is also possible to fix one of the adjusting rings 130a, 130b by means of a press fit and to attach the respective other adjusting ring 130a, 130b adjustably.

FIGS. 4A and 4B show the same embodiment of the inventive retention device as FIGS. 3A and 3B, so its structure and function will not be discussed here. However, the retention device differs in that the sealing mechanism 230 of the embodiment shown in FIGS. 4A and 4B is realized in the form of a cup-shaped seal. Like lip seal 130, said cup-shaped seal 230 is stationarily mounted on filling tube F downstream from the retention device. The diameter of the cylindrical inner surface 230a of the cup-shaped seal corresponds to the outer diameter of filling tube F. A lip 230b projects radially therefrom and is slanted in the filling direction R. The outer diameter of the cup-shaped seal is formed by the external wall of lip 230b and is usually slightly larger than the inner diameter of casing material V. For this reason, the latter sealing contacts the outer diameter of cup-shaped seal 230 under slight tension. In contrast to lip seal 130, cup-shaped seal 230 has a predefined outer diameter. The cup-shaped seal 230 can be fixed on the filling tube by means of a matching fit, or by vulcanizing it onto the filling tube.

The retention device according to the embodiment shown in FIG. 5A corresponds substantially to the embodiment of the retention device in FIGS. 3A to 4B. The main difference consists in the orientation of the first brake ring 210 and of the second brake ring or forming ring 220.

The first brake ring 210 is mounted coaxially around filling tube F. It has the same structure as the first brake ring 110 in the embodiment shown in FIGS. 3A to 4B. However, the first brake ring 210 is rotated 180° about an axis running perpendicularly to center line M. This means that the conical through opening 212 of the first brake ring 210 tapers in filling direction R. Because forming ring 220 is mounted downstream from first brake ring 210, through opening 212b of the conical through hole 212, which formed the discharge opening in the embodiment according to FIGS. 3A to 4B and is now the inlet opening for casing material V, is immediately adjacent the supply VV of casing material stored on filling tube F and smoothes the folded casing material V when it is drawn from supply VV.

As already mentioned, forming ring 220 is likewise mounted coaxially around filling tube F downstream from first brake ring 210. Compared to forming ring 120 in FIGS. 3A to 4B, forming ring 220 is also rotated 180° about an axis running perpendicularly to center line M. The axially projecting lip therefore points in the upstream direction, counter to filling direction R.

It is evident from the structure thus described that deflection sections 212d, 220b face each other in this embodiment also. The Z-shaped course of the pull-off path for casing material V extends here initially from supply VV of casing material V along filling tube F between the latter and through opening 212, along deflection section 212d, then approximately radially away from filling tube F to deflection section 220b of forming ring 220 and over the outer circumference thereof.

The manner in which this configuration of the inventive retention device operates is also the same as the configuration described in FIGS. 3A to 4B. Here, too, the deflection of the casing material V is changed by moving the first brake ring 210 relative to forming ring 220, thus resulting in a change in the pull-off resistance of the casing material.

Figure 5B:
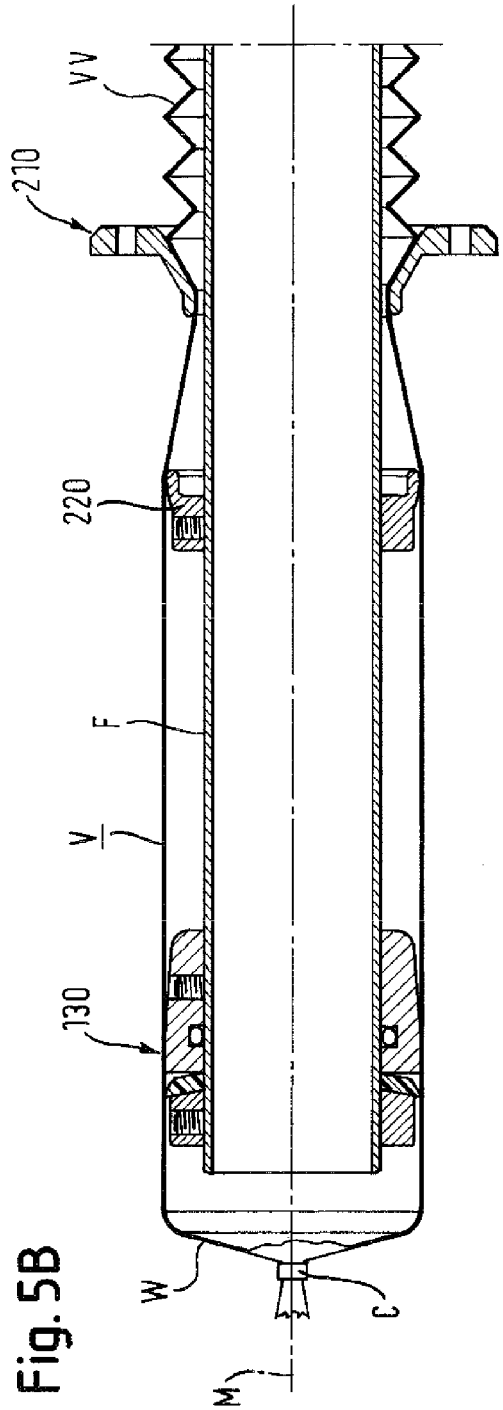

As can also be seen from FIGS. 5A and 5B, a sealing mechanism 130 is mounted coaxially around the filling tube downstream from the retention device. This corresponds exactly in structure and function to the adjustable lip seal 130 described with reference to FIGS. 3A and 3B.

FIGS. 6A and 6B show the retention device of FIGS. 5A and 5B. In contrast to FIGS. 5A and 5B, a cup-shaped seal 230 is provided in the device shown in FIGS. 6A and 6B, instead of lip seal 130. The structure and function of said cup-shaped seal 230 corresponds identically to that of the seal described in FIGS. 4A and 4B.

A desired retention force is set, as described in the foregoing, by moving the first brake ring 10, 110, 210 in the axial direction in relation to the second brake ring 20, 120, 220. This movement can be effected manually or by means of a motor drive, for example via known crank assemblies or by means of hydraulic or pneumatic cylinders.

The first brake ring 10, 110, 210 may also have a larger width than the one shown. In this case, the conical through opening 12, 112 is realized in the form of a bore, without the axially projecting edge which is shown.

In addition to controlling its movement, it is also possible to influence the braking effect of the first brake ring 10, 110 by selecting the material and hence the flexibility of the edge projecting from the first brake ring 10, 110.

As is evident from the foregoing, the second brake ring 20, 120, 220, which can be mounted stationarily on filling tube F, and the sealing ring 30, 130, 230, which can likewise be mounting stationarily on filling tube F, are part of the inventive device. The second brake ring 20, 120, 220 can, of course, be produced in conjunction with the filling tube F during production of the latter. Similarly, sealing ring 30, 130, 230 can be mounted on filling tube F during production of the latter. When the diameter of tubular casing material V is changed, the filling tube portion with the inventive retention device must likewise be changed.

The invention claimed is:

1. A retention device for a tubular casing material for receiving a viscous or granular filling material in a packaging machine having a filling tube for filling the tubular casing material with the filling material, the retention device comprising:
   a first brake ring coaxially about the filling tube, an inner diameter of said brake ring being larger than an outer diameter of the filling tube, and on the inner circumference of the first brake ring a first brake device is provided, along which the casing material can be guided in the filling direction of the filling material against a friction force acting upon the casing material; and
   a second brake ring coaxially about the filling tube and having a counter-brake device on an outer circumference thereof, wherein the casing material can be guided between the first brake device of the first brake ring and the counter-brake device of the second brake ring, and the first brake ring being reversibly displaceable along the filling direction for setting a predetermined friction force for the casing material at the first brake device of the first brake ring and at the counter-brake device of the second brake ring.

2. The retention device of claim 1, where the casing material can be guided in sandwiched form between the first and the second brake ring.

3. The retention device of claim 1, where the brake device of the first brake ring has a first braking surface coaxial with it axis and tapering conically in the filling direction, and the counter-brake device of the second brake ring has a second braking surface coaxial with its axis and conically tapering in the filling direction.

4. The retention device of claim 3, where the gradient of the conical second braking surface of the second brake ring is at least approximately equal to the gradient of the conical first braking surface of the first brake ring.

5. The retention device of claim 1, where the first brake ring has on its inner circumference a first braking deflection section for the casing material capable of deflecting the casing material in a the first deflection of an at least approximately Z-shaped path.

6. The retention device of claim 5, where the second brake ring has on its outer circumference a second counter-braking deflection section capable of deflecting casing material in a second deflection of the at least approximately Z-shaped path.

7. The retention device of claim 1, further comprising:
   a locking mechanism capable of locking the first brake ring in an axial position.

8. A retention device of claim 1, further comprising:
   a sealing mechanism positioned about the filling tube.

9. The retention device of claim 8, where the second brake ring is the sealing mechanism.

10. The retention device of claim 8, where the sealing mechanism is separate from the second brake ring.

11. The retention device of claim 10, where the sealing mechanism is disposed downstream in the filling direction from the second brake ring at a distance therefrom.

12. The retention device of claim 8 where the sealing mechanism is a sealing ring stationarily mounted on the filling tube.

13. In combination:

the retention device of claim 1; and a clipping machine for producing sausage-shaped products from a viscous or granular filling material which can be filled into a tubular casing material, the clipping machine comprising a filling tube for filling the tubular casing material with the filling material in the filling direction, a supply of casing material disposed on the filling tube and the retention device capable of applying a predetermined friction force which acts counter to the filling direction on the casing material which can be drawn off in the filling direction.

14. In combination:

a filling for filling the tubular casing material with filling material;

a first brake ring coaxially about the filling tube, a second brake ring coaxially about the filling tube; and a supply of tubular casing material, the supply of tubular casing material passing over an outer circumference of the second brake ring and within an inner circumference of the first brake ring, the first brake ring being adjustably movable axially relative to the second brake ring setting a predetermined friction force for the tubular casing material at the first brake ring.

15. The combination of claim 14 where the second brake ring is positioned within the inner circumference of the first brake ring.

16. The combination of claim 15, where the brake device of the first brake ring has a first braking surface device coaxial with it axis and tapering conically in the filling direction, and the second brake ring has a second braking surface coaxial with its axis and conically tapering in the filling direction.

17. The combination of claim 14 where the second brake ring is displaced axially from the first brake ring.

18. The combination of claim 17 where a path of the supply of tubular casing material over the outer circumference of the second brake ring and the inner circumference of the first brake ring has an approximate Z-shape.

* * * * *